US009581348B2

United States Patent
Cho (10) Patent No.: US 9,581,348 B2
(45) Date of Patent: Feb. 28, 2017

(54) METHOD OF CONTROLLING THE TEMPERATURE OF A CONTROLLER OF AN ELECTRIC COMPRESSOR FOR AN AIR CONDITIONER IN A VEHICLE

(71) Applicant: Hyundai Motor Company, Seoul (KR)

(72) Inventor: Sung Mun Cho, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 607 days.

(21) Appl. No.: 14/099,761

(22) Filed: Dec. 6, 2013

(65) Prior Publication Data
US 2015/0066217 A1 Mar. 5, 2015

(30) Foreign Application Priority Data
Sep. 4, 2013 (KR) .................. 10-2013-0106313

(51) Int. Cl.
*F25B 49/02* (2006.01)
*F24F 11/00* (2006.01)
(Continued)

(52) U.S. Cl.
CPC .......... *F24F 11/0009* (2013.01); *B60H 1/322* (2013.01); *G05D 23/19* (2013.01);
(Continued)

(58) Field of Classification Search
CPC ............ B60H 2001/3272; F04B 53/08; F25B 49/005; F25B 2600/024; F25B 2700/21153; F25B 2700/21154; H02P 29/0088
(Continued)

(56) References Cited

U.S. PATENT DOCUMENTS 6,523,361 B2 * 2/2003 Higashiyama ....... B60H 1/3222
62/183
2013/0320747 A1 * 12/2013 Ozaki .................. B60L 3/0061
301/6.5

FOREIGN PATENT DOCUMENTS

JP 09-113003 A 5/1997
JP 2001-066002 A 3/2001
(Continued)

OTHER PUBLICATIONS

Notice of Allowance Korean Patent Application No. 10-2013-0106313 dated Nov. 13, 2014.

*Primary Examiner* — Jonathan Bradford
(74) *Attorney, Agent, or Firm* — McDermott Will & Emery LLP (57) ABSTRACT

A method of controlling the temperature of a controller of an electric compressor for an air conditioner in a vehicle is provided, which prevents an excessive increase in temperature of the controller under the control of an output current of the controller. The method includes a temperature-determination stage of detecting the temperature of the controller and determining whether or not the detected temperature is equal to or lower than a reference temperature that is lower than a predefined target temperature by a specified number of degrees when an actuating signal of the air conditioner is generated in a switched-on stage of a vehicle. A current-control stage controls an output current of the controller to decrease the temperature until the detected temperature reaches the reference temperature or lower if the detected temperature is determined to be higher than the reference temperature.

13 Claims, 4 Drawing Sheets

(51) Int. Cl.
    *G05D 23/19*     (2006.01)
    *B60H 1/32*     (2006.01)
    *H02P 29/00*     (2016.01)
    *F25B 49/00*     (2006.01)
    *F04B 53/08*     (2006.01)

(52) U.S. Cl.
    CPC .. *H02P 29/0088* (2013.01); *B60H 2001/3257* (2013.01); *B60H 2001/3272* (2013.01); *F04B 53/08* (2013.01); *F25B 49/005* (2013.01); *F25B 2600/024* (2013.01); *F25B 2700/21153* (2013.01); *F25B 2700/21154* (2013.01)

(58) Field of Classification Search
    USPC ........................................................ 62/259.2
    See application file for complete search history.

(56) References Cited

FOREIGN PATENT DOCUMENTS

| | | |
|---|---|---|
| JP | 2002-243246 A | 8/2002 |
| JP | 2009-138521 A | 6/2009 |
| KR | 10-0737014 B1 | 7/2007 |
| KR | 100737014 B1 | 7/2007 |
| KR | 10-2012-0095735 A | 8/2012 |
| KR | 10-2012-0110858 A | 10/2012 |

\* cited by examiner

METHOD OF CONTROLLING THE TEMPERATURE OF A CONTROLLER OF AN ELECTRIC COMPRESSOR FOR AN AIR CONDITIONER IN A VEHICLE

CROSS-REFERENCE TO RELATED APPLICATION

This application claims under 35 U.S.C. §119(a) the benefit of Korean Patent Application No. 10-2013-0106313 filed Sep. 4, 2013, the entire contents of which are incorporated herein by reference.

FIELD OF THE INVENTION

The present disclosure relates, in general, to a method of controlling the temperature of a controller of an electric compressor for an air conditioner in a vehicle, thereby preventing an excessive increase in temperature of the controller, so as to improve performance of the controller.

BACKGROUND

Generally, an air conditioning system for an eco-friendly vehicle (electric vehicles, hybrid electric vehicles, fuel cell vehicles, etc.) is a full automatic temperature control (FATC) system which employs an electric compressor for improving indoor cooling/heating performance thereby protecting the environment and reducing global warming, etc.

Figure 1:
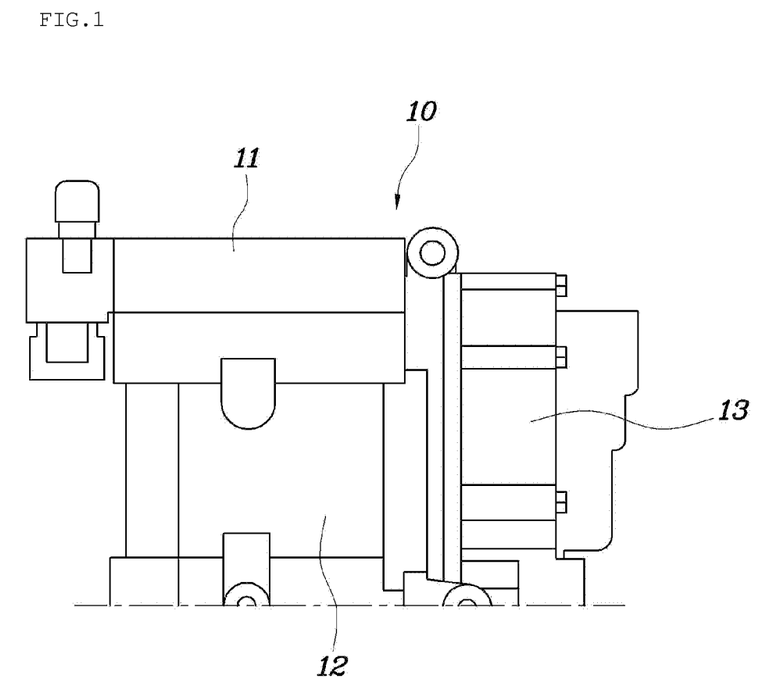
FIG. 1 is a view showing an electric compressor for an air conditioner.

As shown in FIG. 1, the electric compressor 10 has a structure in which a controller 11, a motor 12, and a compressor 13 are integrated in order to obtain excellent space utilization, low weight, and maximized power density. The controller 11 mainly includes an electronic circuit-based PCB and electronic devices. Since the electronic circuits are susceptible to heat, cooling of the controller 11 is an important factor in improving performance of the electric compressor 10.

The controller 11 is generally cooled using both a flow of a coolant in an air conditioner and vehicle-induced airflow during operation of a vehicle. During operation of the vehicle, the controller is sufficiently cooled by a flow of a coolant and vehicle-induced airflow, so the electric compressor 10 can be normally operated.

However, when a vehicle motion stops during operation, such as when waiting for a signal light to change, there is no cooling effect by the vehicle-induced airflow, so the internal temperature of the controller 11 rapidly increases. If the temperature of the controller 11 increases beyond a normal temperature range, the controller 11 stops operating according to a fault-logic set for self-protection, and thus, the operation of the electric compressor is interrupted.

In order to re-activate the interrupted electric compressor, the controller 11 of the electric compressor 10 has to be reset after a vehicle shuts off, which is inconvenient to passengers and degrades the quality of the air conditioner.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present invention is directed to a method of controlling the temperature of a controller of an electric compressor for an air conditioner for a vehicle such that, when the temperature of the controller exceeds a normal temperature range in a switched-on state of a vehicle, output current decreases so as to prevent an excessive increase in the temperature of the controller, thereby improving operation stability and performance of the controller.

In order to achieve the above object, according to one aspect of the present disclosure, there is provided a method of controlling the temperature of a controller of an electric compressor for an air conditioner in a vehicle comprising a temperature-determination stage of detecting the temperature of the controller and determining whether or not the detected temperature is equal to or lower than a reference temperature that is lower than a predefined target temperature by a specified number of degrees when an actuating signal of the air conditioner is generated in a switched-on stage of a vehicle. In a current-control stage, an output current of the controller is controlled to decrease until the detected temperature reaches the reference temperature or lower if the detected temperature is determined to be higher than the reference temperature.

The target temperature may be the temperature that is a boundary between a normal operation range and an abnormal operation range. In certain embodiments, the target temperature may be 60° C.

In certain embodiments, the reference temperature may be 2° C. to 4° C. lower than the target temperature.

The current-control stage may include a stage of comparing the current temperature change per second with a predefined temperature change per second with respect to the controller if the detected temperature is determined to be higher than the reference temperature and, according to the comparison result, controlling the output current of the controller to decrease in two steps.

When the temperature change per second is lower than the predefined temperature change per second, the output current of the controller is repeatedly controlled in a first control step to decrease such that the current rpm of a motor in the compressor decreases by a specified percentage until the detected temperature reaches the reference temperature or less.

When the temperature change per second is higher than the predefined temperature change per second, the output current of the controller is repeatedly controlled in a second control step to decrease such that the current rpm of a motor in the compressor decreases to a minimum value required to drive the compressor until the temperature change per second is equal to or lower than the predefined temperature change per second.

In certain embodiments, the predefined temperature change may be 2° C.

In certain embodiments, the specified percentage may range from 70% to 80%.

According to another aspect of the present disclosure, there is provided a method of controlling the temperature of a controller of an electric compressor for an air conditioner in a vehicle, comprising a temperature-determination stage of detecting the temperature of the controller and determining whether or not the detected temperature is equal to or lower than a predefined target temperature when an actuating signal of the air conditioner is generated in a switched-on stage of a vehicle. In a current-control stage, an output current of the controller is controlled to decrease until the detected temperature reaches the target temperature or lower if the detected temperature is determined to be higher than the target temperature.

The current-control stage may include a stage of comparing a temperature change per second with a predefined temperature change per second with respect to the controller if the detected temperature is determined to be higher than the target temperature, and, according to the comparison result, controlling the output current of the controller to decrease in two steps.

When the temperature change per second is lower than the predefined temperature change per second, the output current of the controller is repeatedly controlled in a first control step to decrease such that the current rpm of a motor in the compressor decreases by a specified percentage until the detected temperature reaches the target temperature or less.

When the temperature change per second is higher than the predefined temperature change per second, the output current of the controller is repeatedly controlled in a second control step to decrease such that the current rpm of a motor in the compressor decreases to a minimum value required to drive the compressor until the temperature change per second is equal to or lower than the predefined temperature change per second.

According to the present disclosure, the temperature of the controller of the electric compressor is prevented from excessively increasing to a certain value having a negative influence upon the operation of the controller, thereby preventing an interruption of the compressor due to an increase in the temperature of the controller, and thereby improving operating stability of the compressor.

BRIEF DESCRIPTION OF THE DRAWINGS

The above and other objects, features and advantages of the present invention will be more clearly understood from the following detailed description when taken in conjunction with the accompanying drawing.

DETAILED DESCRIPTION

Hereinbelow, a description is made in detail of a method of controlling the temperature of a controller of an electric compressor for an air conditioner in a vehicle with reference to the accompanying drawings.

Figure 2:
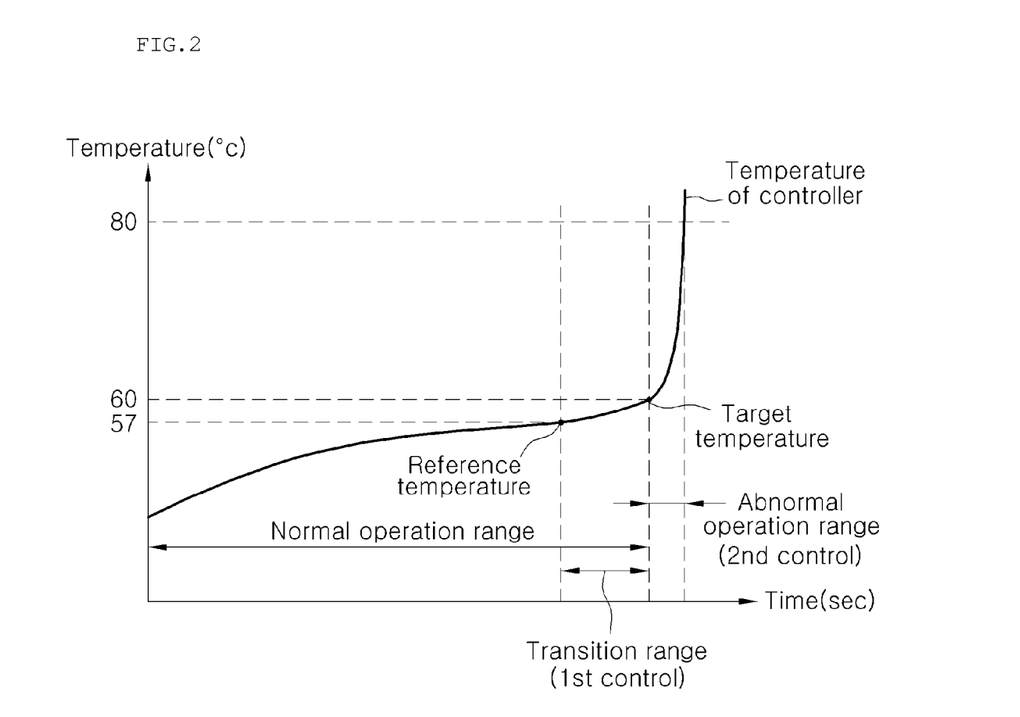
FIG. 2 is a graph showing the temperature control for a controller of the compressor according to the present invention.
Figure 3:
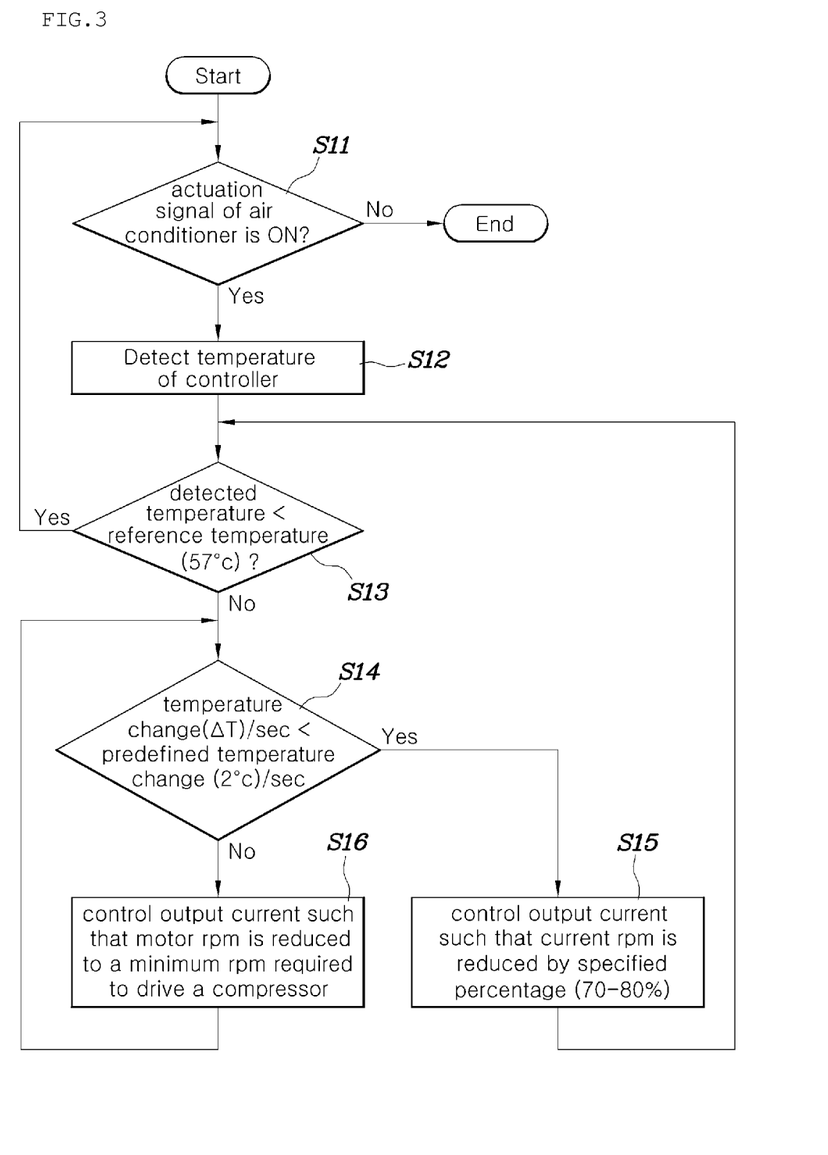
FIGS. 3 and 4 are flow charts showing the temperature control for the controller according to first and second embodiments of the present invention.

As shown in FIGS. 1 to 3, the control method according to a first embodiment includes a temperature-determination stage of detecting the temperature of a controller 11 and determining whether or not the detected temperature is equal to or lower than a reference temperature that is lower than a predefined target temperature by a specified number of degrees when an actuating signal of the air conditioner is generated in a switched-on stage of a vehicle. In a current-control stage, an output current of the controller 11 is controlled to decrease until the detected temperature reaches the reference temperature or less if the detected temperature is determined to be higher than the reference temperature.

The target temperature is the temperature that is a boundary between a normal operation range and an abnormal operation range. The target temperature may preferably be, but not limited to, 60° C. according to the performance of the controller 11.

The normal operation range has a section ranging from 0° C. to 60° C., which does not have a negative influence upon the performance of the controller 11, and the abnormal operation range has a section being higher than 60° C., which has a negative influence upon the performance of the controller.

The reference temperature is the temperature that is 2 to 4 degrees lower than the target temperature (60° C.), so the reference temperature may preferably be, but not limited to, 57° C.

The normal operation range includes a transition range that ranges between the reference temperature (57° C.) and the target temperature (60° C.).

The current-control stage includes a stage of comparing a temperature change ($\Delta T$) per second with a predefined temperature change per second with respect to the controller 11 if the detected temperature of the controller 11 is determined to be higher than the reference temperature (57° C.) and, according to the comparison result, controlling the output current of the controller 11 to decrease in two steps.

The predefined temperature change may be, but not limited to, 2° C.

When the temperature change per second is lower than the predefined temperature change per second (i.e., $\Delta T/\text{sec} < 2°$ C.), the output current of the controller is repeatedly controlled in a first control step to decrease such that the current rpm of a motor 12 in the compressor 10 decreases by a specified percentage until the detected temperature reaches the reference temperature (57° C.) or less.

The first control step is the control step that is carried out in a transition range such that the output current of the controller 11 is controlled so that the current rpm of the motor 12 of the compressor 10 decreases by 70% to 80%.

Further, when the temperature change ($\Delta T$) per second is higher than the predefined temperature change per second (i.e., $\Delta T/\text{sec} > 2°$ C.), the output current of the controller is repeatedly controlled in a second control step to decrease such that the current rpm of a motor 12 in the compressor 10 decreases to a minimum value required to drive the compressor 13 until the temperature change per second is equal to or lower than the predefined temperature change per second.

The second control step is the control step that is carried out in the abnormal operation range such that the output current of the controller 11 is controlled to decrease more than in the first control step.

For example, when the temperature of the controller 11 lies within the normal operation range, the output current of the controller shows a 100% output and at this time, the performance of an air conditioner shows 100%. However, when the temperature of the controller 11 lies within the transition range, the output current of the controller 11 is reduced to about 80% output via the first control step and at this time, the performance of the air conditioner is about 80%.

Although, after the first control step, the output current of the controller 11 is reduced from a level in the normal operation range by a specified level, and thus the performance of an air conditioner is also degraded by a certain level, since the air in a vehicle is already cooled, a passenger hardly feels a temperature change of the air in the vehicle. In the meantime, the output current of the controller 11 is maintained at a reduced level, so that the temperature of the controller 11 cannot increase further, thereby preventing any interruption of the controller 11 and also the air conditioner owing to an increase in the temperature.

Further, when the temperature of the controller 11 lies within the abnormal operation range, the second control step is carried out. Here, the output current of the controller 11 is reduced to about 50% to 60% output, which is lower than in the first control step, and at this time, the performance of the air conditioner becomes considerably reduced.

Although, after the second control step, the controller 11 outputs a minimum current required to drive the compressor 13, so that the output current of the controller 11 and the performance of the air conditioner are considerably reduced, unlike in conventional technology, the controller 11 does not interrupt the operation of the compressor 10 in order to protect itself. Thus, a driver does not need to switch a vehicle off and reset the controller 11, thereby contributing to an improvement in operation stability of a product.

The operation of the first embodiment of the present invention will now be described.

When an actuating signal of an air conditioner is generated in a switched-on state of a vehicle (S11), the temperature of the controller 11, which constitutes an electric compressor for an air conditioner, is detected (S12), and the detected temperature of the controller 11 is compared with the reference temperature (57° C.) (S13).

Here, if the actuating signal of the air conditioner is not generated, the control logic for output current of the controller 11 is not performed.

When the detected temperature of the controller 11 is determined to be higher than the reference temperature in S13, the temperature change ($\Delta T$) per second and the predefined temperature change per second with respect to the controller 11 are compared (S14).

Here, if the temperature change per second is determined to be lower than the predefined temperature change per second (that is, $\Delta T/sec < 2°$ C.), the output current of the controller is reduced in the first control step such that the current rpm of the motor 12 in the compressor 10 is reduced by 70% to 80% (S15).

After the first control step, the control logic proceeds to S13 and the temperature of the controller 11 is compared again with the predefined reference temperature (57° C.). Here, if the temperature of the controller 11 is determined to be lower than the reference temperature (57° C.) (i.e., the temperature of the controller lies within the normal operation range), the control for the output current of the controller 11 is no longer carried out.

However, also in this case, if the temperature of the controller 11 is re-determined to be higher than the reference temperature, the first control step is repeatedly performed until the temperature of the controller 11 reaches the reference temperature (57° C.) or less.

Further, when the temperature change per second is determined to be higher than the predefined temperature change per second (that is, $\Delta T/sec > 2°$ C.), the output current of the controller 11 is reduced in the second control step such that the current rpm of the motor 12 in the compressor 10 is reduced to a minimum rpm required to drive the compressor 13 (S16).

After the second control step, the control logic proceeds to S14 and the temperature change ($\Delta T$) per second is compared again with the predefined temperature change per second. Here, if the temperature change per second is determined to be lower than the predefined temperature change per second (that is, $\Delta T/sec < 2°$ C.), the second control step is no longer carried out, but the first control step is carried out via S15.

However, also in this case, if the temperature change per second is determined to be higher than the predefined temperature change per second (that is, $\Delta T/sec > 2°$ C.), the second control step is repeatedly performed until the temperature change per second reaches the predefined temperature change per second or less.

When the temperature of the controller 11 of the compressor 10 is controlled with the above-mentioned method as set forth in the foregoing, although the performance of an air conditioner is slightly reduced, overheating of the controller can be prevented.

Thus, the controller 11 does not forcibly interrupt the operation of the compressor 10 in order to protect itself from an increase in temperature. Thus, even when a vehicle stops during traveling in hot conditions, e.g. in the summer, the electric compressor 10 is being driven, so that a driver does not need to switch the vehicle off and reset the controller 11 in order to restart the compressor 10, thereby contributing to an improvement in operation stability of a product.

Figure 4:
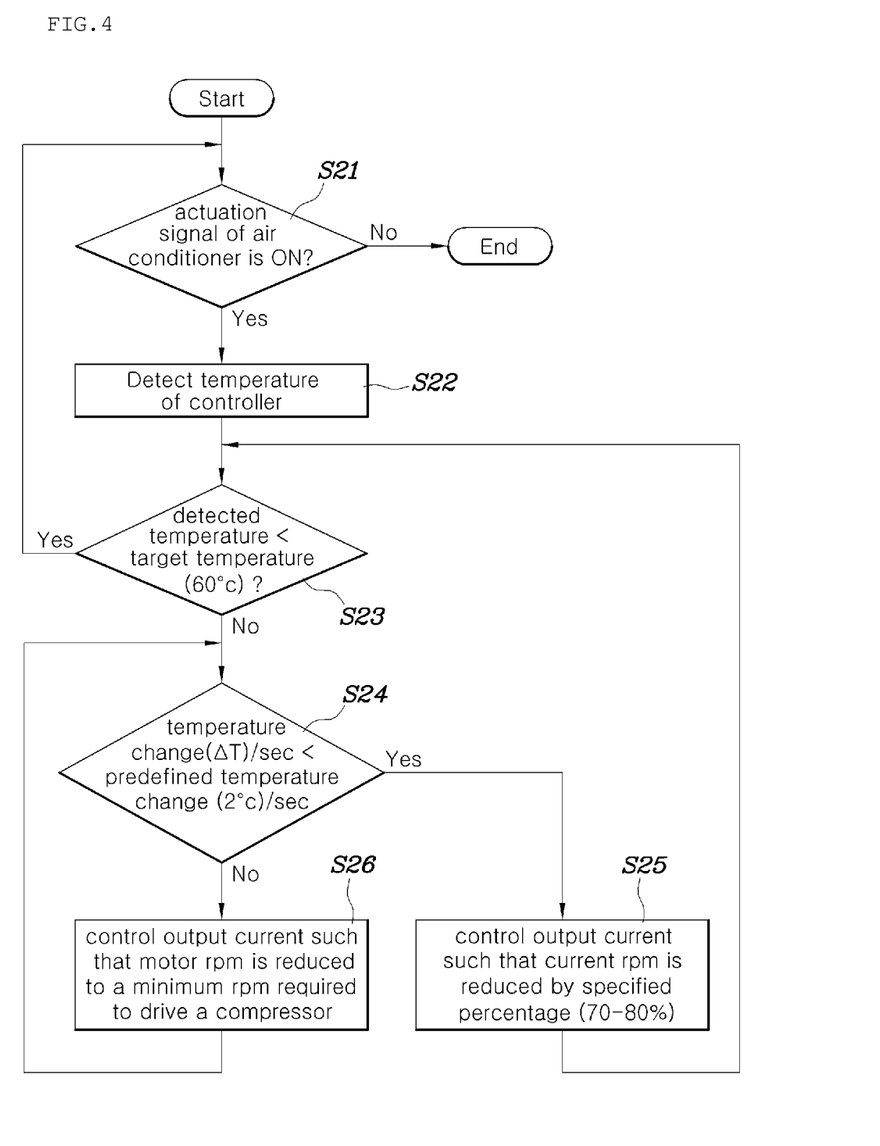

FIG. 4 shows a flow chart of a control method for a controller of an electric compressor in an air conditioner according to a second embodiment of the present disclosure.

The control logic of the first embodiment shown in FIG. 3 includes a comparison between the temperature of the controller 11 with the reference temperature (57° C.), whereas the control logic of the second embodiment shown in FIG. 4 includes a comparison between the temperature of the controller 11 with a target temperature (60° C.).

The control method of the second embodiment includes a temperature-determination stage of detecting the temperature of a controller 11 and determining whether or not the detected temperature is lower than a predefined target temperature when an actuating signal of the air conditioner is generated in a switched-on stage of a vehicle. In a current-control stage, an output current of the controller is controlled to decrease until the detected temperature reaches the target temperature or lower if the detected temperature is determined to be higher than the target temperature.

Here, the target temperature is the temperature that is the boundary between a normal operation range and an abnormal operation range. The target temperature may preferably be, but not limited to, 60° C. according to the performance of the controller 11.

The normal operation range has a section ranging from 0° C. to 60° C., which does not have a negative influence upon the performance of the controller 11, and the abnormal operation range has a section being higher than 60° C., which has a negative influence upon the performance of the controller.

The normal operation range includes a transition range that ranges between a reference temperature (57° C.) and the target temperature (60° C.).

The current-control stage includes a stage of comparing a temperature change ($\Delta T$) per second with a predefined temperature change per second with respect to the controller 11 if the detected temperature of the controller 11 is determined to be higher than the target temperature (60° C.) and, according to the comparison result, controlling the output current of the controller 11 to decrease in two steps.

In certain embodiments, the predefined temperature change may be, but not limited to, 2° C.

In a case of a mode transition to a control disable state due to external environment or an abnormal increase in temperature due to vehicle error, if the condition of $\Delta 2°$ C./sec is present for the increment of the temperature, logic is applied such that a constant base output, i.e. an idle rpm (e.g. 1400 rpm to 1600 rpm), is output without fault of the controller 11. Thus, the controller itself does not output an excessive output, so that the temperature thereof does not increase due to its current-derating function, with the result that the controller 11 continuously operates at a specified temperature level.

When the temperature change per second is lower than the predefined temperature change per second (i.e., $\Delta T/\sec<2°$ C.), the output current of the controller is repeatedly controlled in a first control step to decrease such that the current rpm of a motor 12 in the compressor 10 decreases by a specified percentage until the detected temperature reaches the target temperature (60° C.) or less.

The first control step is the control step that is carried out in a transition range such that the output current of the controller 11 is controlled so that the current rpm of the motor 12 of the compressor 10 decreases by 70% to 80%.

Further, when the temperature change ($\Delta T$) per second is higher than the predefined temperature change per second (i.e., $\Delta T/\sec>2°$ C.), the output current of the controller is repeatedly controlled in a second control step to decrease such that the current rpm of a motor 12 in the compressor 10 decreases to a minimum value required to drive the compressor 13 until the temperature change per second is equal to or lower than the predefined temperature change per second.

The second control step is the control step that is carried out in the abnormal operation range such that the output current of the controller 11 is controlled to decrease more than in the first control step.

For example, when the temperature of the controller 11 lies within the normal operation range, the output current of the controller shows a 100% output and at this time, the performance of an air conditioner is 100%. However, when the temperature of the controller 11 lies within the transition range, the output current of the controller 11 is reduced to about 80% output via the first control step and at this time, the performance of the air conditioner shows about 80%.

Although, after the first control step, the output current of the controller 11 is reduced from a level in the normal operation range by a specified level, and thus the performance of an air conditioner is also degraded by a certain level, since the air in a vehicle is already cooled, a passenger hardly feels an air temperature change in the vehicle. In the meantime, the output current of the controller 11 is maintained at a reduced level, so that the temperature of the controller 11 cannot increase further, thereby preventing any interruption of the controller 11 and also the air conditioner due to an increase in the temperature.

Further, when the temperature of the controller 11 lies within the abnormal operation range, the second control step is carried out. Here, the output current of the controller 11 is reduced to about 50% to 60% lower than in the first control step, and at this time, the performance of the air conditioner becomes considerably reduced.

Although, after the second control step, the controller 11 outputs a minimum current required to drive the compressor 13, so that the output current of the controller 11 and the performance of the air conditioner are considerably reduced, unlike in the conventional technology, the controller 11 does not interrupt the operation of the compressor 10 in order to protect itself. Thus, a driver does not need to switch a vehicle off and reset the controller 11, thereby contributing to an improvement in operation stability of a product.

The operation of the second embodiment of the present invention will now be described.

When an actuating signal of an air conditioner is generated in a switched-on state of a vehicle (S21), the temperature of the controller 11, which constitutes an electric compressor 10 for an air conditioner, is detected (S22), and the detected temperature of the controller 11 is compared with the target temperature (60° C.) (S23).

If the actuating signal of the air conditioner is not generated, the control logic for output current of the controller 11 is not performed.

When the detected temperature of the controller 11 is determined to be higher than the target temperature in S23, the temperature change ($\Delta T$) per second and the predefined temperature change per second with respect to the controller 11 are compared (S24).

The temperature change per second is determined to be lower than the predefined temperature change per second (that is, $\Delta T/\sec<2°$ C.), the output current of the controller is reduced in the first control step such that the current rpm of the motor 12 in the compressor 10 is reduced by 70% to 80% (S25).

After the first control step, the control logic proceeds to S23 and the temperature of the controller 11 is compared again with the predefined target temperature (60° C.). Here, if the temperature of the controller 11 is determined to be lower than the target temperature (60° C.) (i.e., the temperature of the controller lies within the normal operation range), the control for the output current of the controller 11 is no longer carried out.

However, also in this case, if the temperature of the controller 11 is re-determined to be higher than the target temperature, the first control step is repeatedly performed until the temperature of the controller 11 reaches the target temperature (60° C.) or less.

Further, when the temperature change per second is determined to be higher than the predefined temperature change per second (that is, $\Delta T/\sec>2°$ C.), the output current of the controller 11 is reduced in the second control step such that the current rpm of the motor 12 in the compressor 10 is reduced to a minimum rpm required to drive the compressor 13 (S26).

After the second control step, the control logic proceeds to S24 and the temperature change ($\Delta T$) per second is compared again with the predefined temperature change per second. Here, if the temperature change per second is determined to be lower than the predefined temperature change per second (that is, $\Delta T/\sec<2°$ C.), the second control step is no longer carried out, but the first control step is carried out via S25.

However, also in this case, if the temperature change per second is determined to be higher than the predefined temperature change per second (that is, $\Delta T/\sec>2°$ C.), the second control step is repeatedly performed until the temperature change per second reaches the predefined temperature change per second or less.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of controlling the temperature of a controller of an electric compressor for an air conditioner in a vehicle, comprising:

a temperature-determination stage of detecting the temperature of the controller and determining whether or not the detected temperature is equal to or lower than a reference temperature that is lower than a predefined target temperature by a specified number of degrees when an actuating signal of the air conditioner is generated in a switched-on stage of the vehicle; and a current-control stage of controlling an output current of the controller to decrease the temperature until the detected temperature reaches the reference temperature or lower if the detected temperature is determined to be higher than the reference temperature;

wherein the current-control stage comprises a stage of comparing a temperature change per second with a predefined temperature change per second with respect to the controller if the detected temperature is determined to be higher than the reference temperature and, according to the comparison result, controlling the output current of the controller to decrease in two steps, and wherein the output current of the controller is repeatedly controlled in a first control step to decrease such that a current rpm of a motor in the compressor decreases by a specified percentage until the detected temperature reaches the reference temperature or less when the temperature change per second is lower than the predefined temperature change per second.

2. The method according to claim 1, wherein the target temperature is a temperature that is a boundary between a normal operation range and an abnormal operation range.

3. The method according to claim 1, wherein the target temperature is 60° C.

4. The method according to claim 1, wherein the reference temperature is 2° C. to 4° C. lower than the target temperature.

5. The method according to claim 1, wherein the output current of the controller is repeatedly controlled in a second control step to decrease such that a current rpm of a motor in the compressor decreases to a minimum value required to drive the compressor until the temperature change per second is equal to or lower than the predefined temperature change per second when the temperature change per second is higher than the predefined temperature change per second.

6. The method according to claim 1, wherein the predefined temperature change is 2° C.

7. The method according to claim 1, wherein the specified percentage ranges from 70% to 80%.

8. A method of controlling the temperature of a controller of an electric compressor for an air conditioner in a vehicle, comprising:

a temperature-determination stage of detecting the temperature of the controller and determining whether or not the detected temperature is equal to or lower than a predefined target temperature when an actuating signal of the air conditioner is generated in a switched-on stage of the vehicle; and a current-control stage of controlling an output current of the controller to decrease until the detected temperature reaches the target temperature or lower if the detected temperature is determined to be higher than the target temperature, wherein the current-control stage comprises a stage of comparing a temperature change per second with a predefined temperature change per second with respect to the controller and, according to the comparison result, controlling the output current of the controller to decrease in two steps if the detected temperature is determined to be higher than the target temperature, and wherein the output current of the controller is repeatedly controlled in a first control step to decrease such that the current rpm of a motor in the compressor decreases by a specified percentage until the detected temperature reaches the target temperature or less when the temperature change per second is lower than the predefined temperature change per second.

9. The method according to claim 8, wherein the target temperature is a temperature that is a boundary between a normal operation range and an abnormal operation range.

10. The method according to claim 8, wherein the target temperature is 60° C.

11. The method according to claim 8, wherein the output current of the controller is repeatedly controlled in a second control step to decrease such that the current rpm of a motor in the compressor decreases to a minimum value required to drive the compressor when the temperature change per second is higher than the predefined temperature change per second until the temperature change per second is equal to or lower than the predefined temperature change per second.

12. The method according to claim 8, wherein the predefined temperature change is 2° C.

13. The method according to claim 8, wherein the specified percentage ranges from 70% to 80%.

* * * * *